United States Patent [19]
Hoyle, Jr.

[11] Patent Number: 6,070,947
[45] Date of Patent: Jun. 6, 2000

[54] DECORATIVE WHEEL COVER ASSEMBLY FOR USE WITH A STANDARD WHEEL CONSTRUCTION

[75] Inventor: Frederick L. Hoyle, Jr., Pickerington, Ohio

[73] Assignee: Reflexxion Automotive Products LLC, Memphis, Tenn.

[21] Appl. No.: 09/007,302

[22] Filed: Jan. 13, 1998

[51] Int. Cl.$^7$ ........................................... B60B 7/14
[52] U.S. Cl. ................................. 301/37.37; 301/108.1; 301/108.4
[58] Field of Search ................... 301/37.1, 108.1, 301/108.4, 37.37, 37.42

[56] References Cited

U.S. PATENT DOCUMENTS

| | | |
|---|---|---|
| Re. 35,497 | 4/1997 | Carter, III . |
| 3,883,181 | 5/1975 | Dissinger . |
| 3,915,502 | 10/1975 | Connell . |
| 4,003,604 | 1/1977 | Connell . |
| 4,606,582 | 8/1986 | Warren . |
| 4,844,551 | 7/1989 | Hempelmann . |
| 4,881,783 | 11/1989 | Campbell .............................. 301/37.1 |
| 4,998,780 | 3/1991 | Eshler et al. ........................... 301/37.1 |
| 5,031,965 | 7/1991 | Buerger ................................. 301/37.1 |
| 5,046,784 | 9/1991 | Carter, III . |
| 5,150,949 | 9/1992 | Wang ................................... 301/108.1 |
| 5,188,429 | 2/1993 | Heck et al. ............................ 301/37.1 |
| 5,286,093 | 2/1994 | Wright ................................. 301/37.37 |
| 5,443,582 | 8/1995 | Ching ................................. 301/37.37 |
| 5,494,336 | 2/1996 | Russell ............................... 301/37.37 |
| 5,503,465 | 4/1996 | Price et al. . |
| 5,630,653 | 5/1997 | Polka . |
| 5,667,281 | 9/1997 | Ladouceur ......................... 301/37.37 |
| 5,722,735 | 3/1998 | Wright et al. ...................... 301/37.37 |
| 5,752,794 | 5/1998 | Krawczak ........................... 301/37.37 |
| 5,842,749 | 12/1998 | DiMarco ............................. 301/37.1 |
| 5,845,973 | 12/1998 | Chase ................................. 301/37.1 |

*Primary Examiner*—D. Glenn Dayoan
*Assistant Examiner*—Long Bao Nguyen
*Attorney, Agent, or Firm*—Gifford, Krass, Groh, Sprinkle, Anderson & Citkowski, P.C.

[57] ABSTRACT

A decorative covering assembly for use with a standard wheel construction, the wheel construction including a drum-shaped inner member capable of being mounted to a vehicle axle and including a plurality of threaded mounting studs extending in circumferentially arrayed fashion from the drum member. A circular shaped decorative covering member has a specified thickness and includes a first inner diameter, an outwardly angled and annularly extending body and a second outer diameter. A plurality of semicircular and flared lip portions are formed within and extend around the first inner diameter of the covering member and correspond in number and arrangement to the threaded mounting studs so that ends of the mounting studs extend through the flared lip portions upon positioning the covering member within the drum member. A plurality of pieces of two-sided adhesive tape provide temporary securing means between the covering member and the drum member and a plurality of lugs are subsequently threadably engaged over the projecting ends of the mounting studs to permanently secure the covering member against the drum member at a first location. A center cap is positioned over the open inner diameter of the circular covering member and additional plastic lug caps are provided for securing the center cap to the lugs. Additional tightening of the lug caps further causes an outer angled edge portion of the center cap to bias the covering member against the drum member at a further location in proximity to the inner diameter and so as to securably engage the covering member to the drum member in the area substantially along the inner diameter of the covering member.

9 Claims, 2 Drawing Sheets

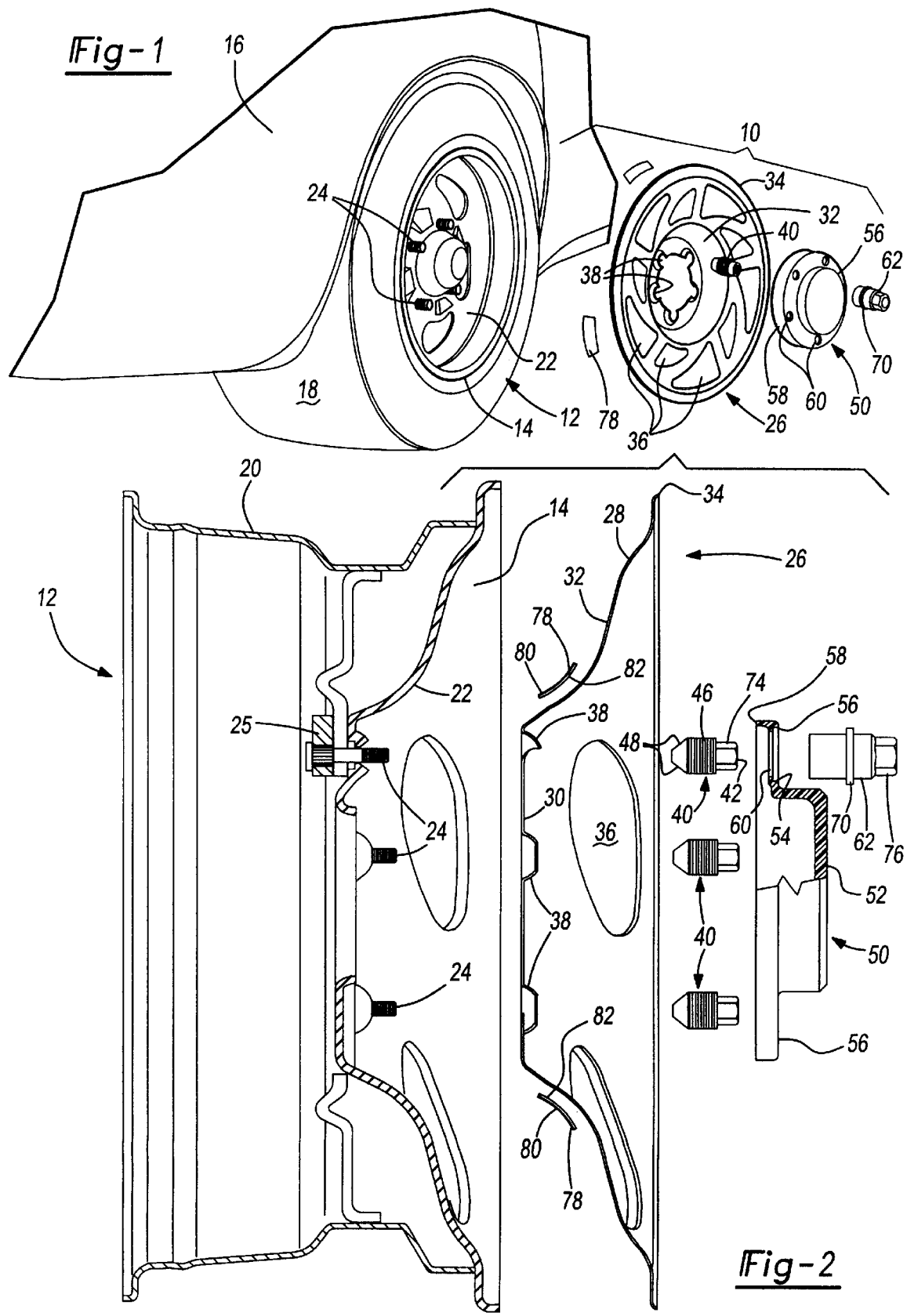

DECORATIVE WHEEL COVER ASSEMBLY FOR USE WITH A STANDARD WHEEL CONSTRUCTION

BACKGROUND OF THE INVENTION

1. Field of the Invention

The present invention relates generally to decorative wheels and wheel assemblies and, more particularly, to a decorative wheel skin cover for use with a standard wheel construction for providing the wheel with a more attractive appearance and at a lesser cost than would otherwise be necessary by the purchase of new wheels.

2. Description of the Prior Art

Decorative wheel and wheel covering devices are known in the art, the purpose for which is to provide a quick and inexpensive option for increasing the attractiveness of the vehicle's wheels and without the requisite expense of purchasing new wheels and the need for elevating the vehicle to remove the old wheels and to mount and balance the new replacement wheels. A particular purpose behind such wheel coverings, or wheel skins, is to replicate the appearance of chrome plated steel wheels at considerable less cost than purchasing new wheels.

One type of commonly known wheel covering according to the prior art incorporates the feature of inwardly contouring an outer annular edge of the wheel covering so that, upon assembly of the wheel over the exposed inner drum, the outer edge engages in a snap-fit manner the corresponding contours in the outer diameter of the drum. While being an effective securing means in many instances, the snap-fit arrangement of the covering member against the drum according to this known embodiment suffers from the shortcoming that the covering member may "fly off" the wheel drum during travel of the vehicle at higher speeds, and this often results from inadequate or incomplete sealing between the covering member and the drum. It is also useful to point out that, during high speed rotation of the wheel, the greatest generation of centrifugal forces will be located at the outer diameter of the wheel covering and it can also be argued that pretty much everyone has witnessed at one time or another a wheel covering flying off of a vehicle wheel as a result of inadequate holding forces established therebetween.

Other means for securing a decorative covering member to a vehicle hub or drum are illustrated in the prior art, and such references include U.S. Pat. No. 3,915,502, issued to Connell, which teach the use of double-sided adhesives by themselves for securing the wheel covering to the drum. Other known covering member devices incorporate the use of clips or other similar retaining means for securing a covering member onto a vehicle drum and the prior art references being concurrently submitted herewith are referred to as illustrating several different variations of such assemblies. U.S. Pat. No. 5,503,465, issued to Price et al., is further cited as teaching a more recent method and system for mounting decorative wheel covers by means of adapters which frictionally engage the outer peripheries of standard lug nuts and without affecting the seating of the lug nuts to the wheels.

SUMMARY OF THE PRESENT INVENTION

The present invention is an improved decorative covering assembly over those taught by the prior art in that, not only does it primarily secure the covering member to the underlying wheel drum at its inner diameter, it also provides additional/reinforcing and biasing engagement of the covering member against the surface of the wheel drum in the proximity of the covering members inner diameter. The advantage of multiple and biasing engagement of the covering member against the wheel drum at the inner diameter is that it overcomes many of the problems previously associated with earlier versions of covering members, and particularly those which relied substantially or solely upon the use of adhesives or snap-fit engagement around the outer diameter.

The decorative covering assembly according to the present invention is employed with a standard wheel construction which includes a drum-shaped inner member capable of being mounted to a vehicle axle so as to rotate therewith. A tire is mounted around the outer diameter of the drum and the drum further includes an exterior facing surface which is inwardly recessed and from which a plurality of circumferentially arrayed and exteriorly threaded mounting studs extend.

A circular shaped decorative covering member has a specified thickness and includes a first inner diameter, an outwardly angled and annularly extending body and a second outer diameter. The decorative covering member corresponds in overall dimension to the inner recess of the wheel drum and further includes, along its inner diameter, a plurality of substantially semicircular and flared lip portions through which ends of the mounting studs are inserted.

A plurality of lugs each include an axially extending interior aperture upon which are placed pluralities of interior threads, the lugs being threadably engaged over the ends of the mounting studs to secure the decorative member to the drum-shaped member. The lugs each further include an inwardly angled, or inwardly tapered, forward surface engaging the inner diameter at each outwardly flared lip portion and also include spiraling threads placed upon an exterior surface of each lug.

A center cap is provided and includes a middle portion with an inner diameter ledge and an outer and annular extending portion which terminates in an angled edge. A plurality of circumferentially arrayed apertures are formed through the annular portion and correspond in arrangement to the lugs. A plurality of lug caps are included, each of which possesses an open interior cavity which is defined by an inner cylindrical wall and with interiorly facing threads placed along a forward portion of the open interior cavity. An outer annular shoulder projects from an exterior surface of each of the lug caps at an intermediate axial location.

The forward portion of the lug caps are capable of being inserted through the arrayed apertures and threadably engage with the matching spiraling threads on the exterior of the lugs until the outer annular shoulder abuts against the inner diameter ledge of the center cap. Further tightening of the lug caps results in the angled of the center cap biasing an intermediate and annular location of the decorative member at an additional position proximate to its inner diameter and to provide additional reinforcing engagement of the decorative covering member against the underlying wheel drum.

Adhesive means are provided for temporarily securing the covering member in positioned alignment over the exposed and recessed surface of the wheel drum prior to application of the lugs and typically include a plurality of strips of a two-sided tape which arranged in spaced apart and circumferentially extending fashion so that a first side of each secures against the inward recess of the drum member and a second opposite side adhesively secures against the outwardly angled and annularly extending body of the decorative member. Other types of adhesive securing means are also capable of being utilized, such as a silicone glue or the like for purposes of achieving the temporary positioning securement of the wheel cover.

The decorative wheel covering member and center cap are each constructed of a durable stainless steel material and which is consecutively nickel plated and chrome plated so as to provide an attractive chrome surface appearance and without rusting which normally occurs in other chrome based wheel covers. The lug nuts are further constructed of a durable plastic material which is capable of withstanding the tightening and deflection forces attendant with installing the center cap.

BRIEF DESCRIPTION OF THE DRAWINGS

Reference will now be made to the attached drawings, when read in combination with the following specification, wherein like reference numerals refer to like parts throughout the several views, and in which:

FIG. 1 is an exploded view of the decorative covering assembly for installation over a conventional wheel drum according to the present invention;

FIG. 2 is a side elevational view in likewise exploded fashion illustrating in greater detail the arrangement of parts which make up the decorative covering assembly according to the present invention.

DESCRIPTION OF THE PREFERRED EMBODIMENTS

Figure 3:
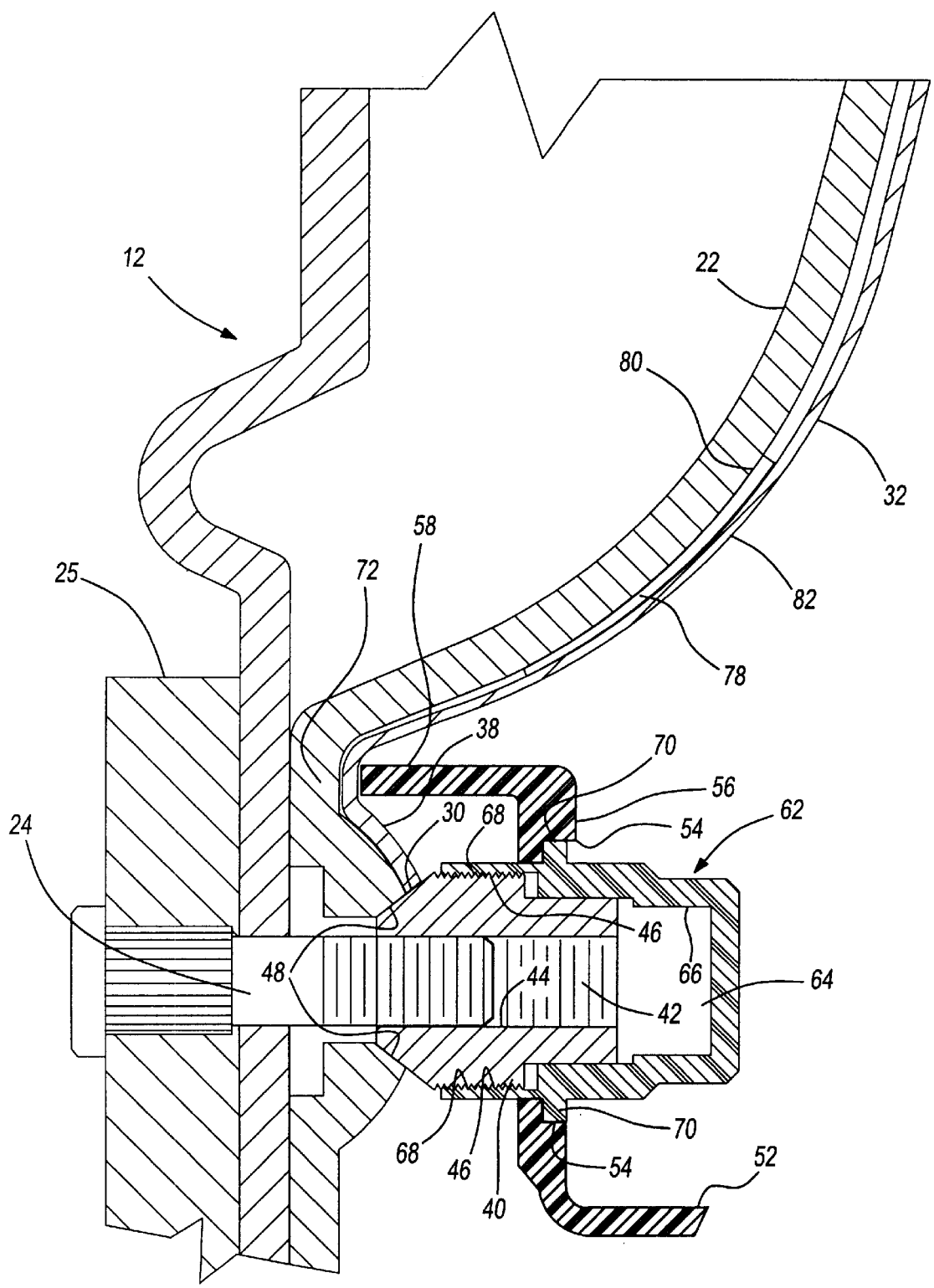
FIG. 3 is an enlarged sectional view in cutaway of a selected lug and center cap assembly secured to a threaded mounting stud according to the present invention.

Referring now to FIG. 1, an exploded view is illustrated at 10 of a decorative covering assembly for use with a standard wheel construction 12 according to the present invention. The wheel construction typically includes a drum-shaped inner member 14 which is capable of being mounted to an axle (not shown) of a vehicle 16 so as to be capable of rotating therewith. A tire 18 is mounted to an outer annular face (see 20 in FIG. 2) of the wheel construction 12 and an inwardly recessed and exterior facing surface 22 is formed within the drum-shaped inner member 14. A plurality of circumferentially arrayed and exteriorly threaded mounting studs 24 further extend from the inwardly recessed and exterior facing surface 22 in the manner illustrated and, as is best shown in FIG. 2, each of the studs 24 are anchored by a spindle portion 25 within the wheel construction 12.

Referring again to FIGS. 1 and 2, a circular shaped decorative covering member 26 is shown and includes a specified and substantially thin thickness 28, as well as an annular inner surface 30 which forms a first inner diameter, an outwardly angled and annularly extending body 32 (or mid-portion), and a second outer diameter 34. The decorative member 26 is configured so as to substantially correspond in overall dimension with the inward recess of the drum-shaped member 14 which is defined by the exterior facing surface 22. The decorative covering member 26 is further constructed of a durable and resilient material, possibly a plastic or heavy duty polymer, but is preferably of a stainless steel construction which is consecutively nickel plated and chrome plated by a known plating process (not shown) in order to achieve significant rust-resistant capabilities.

The decorative covering member 26 further includes a plurality of individual polygonal shaped and decorative recesses 36 extending in annular and spaced apart fashion around the outwardly angled and annularly extending body according to some desired pattern. It is further understood that the decorative recesses 36 are one attractive option for such a covering member 26, other additional options include forming the metal or polymer body of the covering member such that solid and decorative patterns are formed therein and further possibly painting an decorative pattern of some type directly upon the annularly extending mid-portion 32.

Referring again to FIGS. 1 and 2, a plurality of substantially semicircular and flared lip portions 38 are formed both within and around the annular inner surface 30 of the first inner diameter and correspond both in number and arrangement to the plurality of threaded mounting studs 24 extending from the wheel 12. The outward flare of each of the lip portions 38 is best illustrated in FIG. 2 and involves forming the inner annular surface 30 of the covering member 26 by a stamping or other forming process as is customarily known in the art. The flared lip portions 38 according to the preferred embodiment are actually formed within the covering member 26 such that they radially extend in a fashion actually somewhat greater than a semicircular (or 180 degree) pattern and are more on the order of 210 degrees to 240 degrees (any of these patterns still falling within the designation of substantially semi-circular). However, in any event, each of the flared lip portions 38 are open to the annular inner surface 30 in the manner illustrated. As is further evident from the elevational view of FIG. 2, the flared lip portions 38 in the decorative covering member 26 are such that the ends of the mounting studs align with and are capable of extending through the semi-circular recesses upon the covering member 26 being installed within the inward recess of the drum-shaped member 12.

Referring again to FIGS. 1 and 2, and also now to FIG. 3, a plurality of lugs 40 are provided, each of which including an axially extending interior aperture 42 (FIG. 3) upon which are placed pluralities of interior threads 44, each of the lugs 40 being threadably engaged over the ends of the mounting studs in the manner illustrated and in order to secure the decorative member 26 to the drum-shaped inner member 14 of the covering member. Each of the lugs 40 including additional spiraling threads 46 upon an exterior surface thereof and each of the lugs 40 also having inwardly angled forward surfaces 48 (or inwardly tapered surfaces) which, upon threaded engagement of the lugs 40, bias inwardly the inner annular surface 30 of the decorative covering member 26.

A center cap 50 is provided and includes a middle portion 52 having an inner diameter ledge 54 and an outer and annular extending portion 56 which terminates in an angled edge 58, the angled edge 58 being in a direction facing the inner drum 14 of the wheel construction 12 upon arraying the center cap 50 in a position for engaging over the covering member 26. A plurality of circumferentially arrayed apertures 60 are formed through the annular extending portion 56 in corresponding arrangement to the lugs 40 as is best shown in FIGS. 1 and 2. The center cap 50 is constructed of the same material as the decorative covering member 26 and is preferably a stainless steel construction which is again consecutively plated with nickel and chrome layers.

A plurality of lug caps 62 are provided and are preferably constructed of a durable plastic material. Each of the lug caps 62 includes an open interior cavity 64 (see FIG. 3) which is defined by an inner cylindrical wall 66 and further including interiorly facing threads 68 which are placed along a forward portion of the open interior cavity 64. An outer annular shoulder 70 projects from an exterior surface of each of the lug caps 62 at an intermediate axial location as shown in the illustrations.

The interiorly facing threads 68 at the forward portion of the lug caps 62 are threadably engaged with the matching and exteriorly facing spiraling threads 46 on the lugs 40, as is again best illustrated in the cutaway view of FIG. 3, until the outer annular shoulder 70 abuts against the inner diameter ledge 54 of the center cap. Further tightening of the lug caps 62 results in the inwardly angled edge 58 of the center cap 50 biasing an intermediate location 72 of the decorative member 26 which is positioned between the first inner diameter created by the inner annular edge 30 and the outwardly angled and annularly extending body 32. The lugs 40 are hex-shaped at 74 and the cap nuts 62 are further hex-shaped at 76 (see FIG. 2) in conventional fashion and to facilitate tightening against the wheel assembly. The angled edge 58 of the center cap 50 biases the decorative member 26 against the drum-shaped inner member 14 in complementary fashion to the lugs 40 threadably engaged over the ends of the mounting studs 24. In this manner, the decorative covering assembly according to the present invention achieves the desired result of providing primary and secondary engagement of a decorative member in the region of its inner diameter and in a novel and improved fashion over that which is taught by the prior art.

It is also desirous to utilize a means for temporarily holding the covering member 26 in position over the wheel construction 12 and such is typically provided by an adhesive securing means. In the preferred embodiment, the adhesive securing means is provided as a plurality of individual pieces of two-sided adhesive tape 78, the pieces of tap 78 being arranged in spaced apart and circumferentially extending fashion and so that a first side 80 of each piece adhesively secures against the inward recess 22 of the drum-shaped inner member 14 and a second opposite side 82 adhesively secures against the outwardly angled and annularly extending body 32 of the decorative member 26. It is again contemplated that other useful and preliminary adhesive securing means can be employed, and such would be understood to include a silicone glue or other liquid applied material.

It is therefore apparent that the present invention discloses a novel and useful decorative covering assembly for use with a standard wheel construction. Additional preferred embodiments will become apparent to those skilled in the art to which it pertains without deviating from the scope of the appended claims.

I claim:

1. A decorative covering assembly for use with a standard wheel construction, the wheel construction including a drum-shaped inner member which is capable of being mounted to a vehicle axle so as to rotate therewith and around which is mounted a tire, the drum-shaped inner member further including an inwardly recessed and exterior facing surface from which a plurality of circumferentially arrayed and exteriorly threaded mounting studs extend, said decorative covering assembly comprising:

a circular shaped decorative covering member having a specified thickness and including a first inner diameter, an outwardly angled and annularly extending body and a second outer diameter, said decorative member corresponding in overall dimension with an inward recess of the drum-shaped inner member;

a plurality of substantially semicircular and outwardly flared lip portions formed within and around said first inner diameter of said decorative member and corresponding in number and arrangement to the plurality of threaded mounting studs extending from the drum-shaped inner member so that the threaded ends of the mounting studs align with and extend in an outwardly facing manner through semi-circular recesses formed by said outwardly flared lip portions upon said decorative member being installed within the inward recess of the drum-shaped member;

a plurality of lugs, each of which including an axially extending interior aperture upon which are placed pluralities of interior threads, said lugs being threadably engaged over the ends of the mounting studs to secure said decorative member to the drum-shaped member; and a center cap and additional fastening means for securing said center cap over said inner diameter of said decorative member and for additionally biasing said decorative member against the drum-shaped inner member.

2. The decorative covering assembly according to claim 1, further comprising adhesive securing means for temporarily securing said decorative member within the inward recess of the drum-shaped inner member and prior to threaded engagement of said lugs.

3. The decorative covering assembly according to claim 2, said adhesive securing means further comprising a plurality of individual pieces of two-sided tape, said pieces of tape being arranged in spaced apart and circumferentially extending fashion and so that a first side of each adhesively secures against the inward recess of the drum-shaped inner member and a second opposite side adhesively secures against said outwardly angled and annularly extending body of said decorative member.

4. The decorative covering assembly according to claim 1, each of said lugs further comprising an inwardly angled forward surface engaging said inner diameter at each of said outwardly flared lip portions.

5. The decorative covering assembly according to claim 1, said decorative covering member including a plurality of individual polygonal shaped and decorative recesses extending in annular and spaced apart fashion around said outwardly angled and annularly extending body.

6. The decorative covering assembly according to claim 1, said decorative covering member and said center cap each being constructed of a durable stainless steel material and consecutively nickel plated and chrome plated so as to achieve rust resistant capability.

7. The decorative covering assembly according to claim 1, said lug caps being constructed of a durable plastic material.

8. A decorative covering assembly for use with a standard wheel construction, the wheel including a drum-shaped inner member and an inwardly recessed and exterior facing surface from which a plurality of circumferentially arrayed and exteriorly threaded mounting studs extend, said decorative covering assembly comprising:

a decorative covering member having a selected overall shape and thickness for being received within the inward recess of the drum-shaped member, said covering member including an inner diameter within which are formed a plurality of substantially semicircular and outwardly flared lip portions corresponding to the number and arrangement of the mounting studs so that the exteriorly threaded ends of the mounting studs align with and extend in an outwardly facing manner through semi-circular recesses formed by said outwardly flared lip portions; and a plurality of lugs, each of said lugs including an axially extending interior aperture upon which are placed pluralities of interior threads, said lugs being threadably engaged over the outwardly extending and threaded ends of the mounting studs extending through said flared lip portions of said decorative covering member to secure said decorative member to the drum-shaped member.

9. A decorative covering assembly for use with a standard wheel construction, the wheel construction including a drum-shaped inner member which is capable of being mounted to a vehicle axle so as to rotate therewith and around which is mounted a tire, the drum-shaped inner member further including an inwardly recessed and exterior facing surface from which a plurality of circumferentially arrayed and exteriorly threaded mounting studs extend, said decorative covering assembly comprising:

- a circular shaped decorative covering member having a specified thickness and including a first inner diameter, an outwardly angled and annularly extending body and a second outer diameter, said decorative member corresponding in overall dimension with an inward recess of the drum-shaped inner member;
- a plurality of substantially semicircular and flared lip portions formed within an around said first inner diameter of said decorative member and corresponding in number and arrangement to the plurality of threaded mounting studs extending from the drum-shaped inner member so that ends of the mounting studs align with and extend through semi-circular recesses formed by said flared lip portions upon said decorative member being installed within the inward recess of the drum-shaped member;
- a plurality of lugs, each of which including an axially extending interior aperture upon which are placed pluralities of interior threads, said lugs being threadably engaged over the ends of the mounting studs to secure said decorative member to the drum-shaped member;
- a center cap and additional fastening means for securing said center cap over said inner diameter of said decorative member and for additionally biasing said decorative member against the drum-shaped inner member, said additional fastening means each further comprising:
- a plurality of lug caps, each of said lug caps including an open interior cavity which is defined by an inner cylindrical wall and with interiorly facing threads placed along a forward portion of said open interior cavity, an outer annular shoulder projecting from an exterior surface of each of said lug caps at an intermediate axial location;
- said center cap including a middle portion with an inner diameter ledge and an outer and annular extending portion which terminates in an angled edge, a plurality of circumferentially arrayed apertures being formed through said annular portion and corresponding in arrangement to said lugs so that said forward portion of said lug caps are capable of being inserted through said circumferentially arrayed apertures; and
- said forward portion of said lug caps threadably engaging with matching spiraling threads placed upon an exterior surface of each of said lugs until said outer annular shoulder abuts against said inner diameter ledge, further tightening of said lug caps resulting in said angled edge of said center cap biasing an intermediate and annular location of said decorative member which is positioned between said first inner diameter and said outwardly angled and annularly extending body, said angled edge of said center cap biasing the decorative member against the drum-shaped inner member in complementary fashion to said lugs threadably engaged over the ends of the mounting studs.

* * * * *